United States Patent
Manning et al.

(10) Patent No.: US 8,644,833 B1
(45) Date of Patent: Feb. 4, 2014

(54) METHOD AND SYSTEM USING A MOBILITY SERVER FOR HANDOFF OF A MULTI-MODE MOBILE STATION

(75) Inventors: Serge M. Manning, Overland Park, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1932 days.

(21) Appl. No.: 11/144,338

(22) Filed: Jun. 3, 2005

(51) Int. Cl.
*H04W 36/00* (2009.01)

(52) U.S. Cl.
USPC .......... 455/437; 455/436; 455/440; 455/442; 455/443; 455/444

(58) Field of Classification Search
USPC ......... 455/436, 437, 438, 439, 440, 441, 442, 455/443, 444
See application file for complete search history.

(56) References Cited

U.S. PATENT DOCUMENTS

| | | | |
|---|---|---|---|
| 6,721,565 B1 * | 4/2004 | Ejzak et al. | 455/436 |
| 2004/0090937 A1 | 5/2004 | Chaskar et al. | |
| 2004/0146021 A1 | 7/2004 | Fors et al. | |
| 2004/0192294 A1 | 9/2004 | Pan et al. | |
| 2004/0203788 A1 | 10/2004 | Fors et al. | |
| 2004/0203791 A1 * | 10/2004 | Pan et al. | 455/442 |
| 2004/0218575 A1 | 11/2004 | Ibe et al. | |
| 2004/0219918 A1 | 11/2004 | Kakishima et al. | |
| 2004/0246990 A1 | 12/2004 | Krishnamurthi et al. | |
| 2004/0264410 A1 | 12/2004 | Sagi et al. | |
| 2005/0047435 A1 | 3/2005 | Segal et al. | |
| 2005/0070288 A1 | 3/2005 | Belkin et al. | |
| 2005/0136927 A1 * | 6/2005 | Enzmann | 455/436 |
| 2006/0265382 A1 * | 11/2006 | Armanino et al. | 707/10 |
| 2007/0087748 A1 * | 4/2007 | Du et al. | 455/436 |

* cited by examiner

*Primary Examiner* — Justin Lee

(57) ABSTRACT

A multi-mode mobile station includes a first interface for wireless communication with a wireless local area network (WLAN) and a second interface for wireless communication with a wireless wide area network (WWAN). A mobility server facilitates call handoffs for the multi-mode mobile station, from the WLAN to the WWAN and vice versa. The mobility server maintains an activity log for the multi-mode mobile station. When the multi-mode mobile station becomes involved in a call, the mobility server stores call information regarding the call in the activity log. During the call, the multi-mode mobile station transmits a handoff request. In response to the handoff request, the mobility server controls establishment of a bearer path for call handoff between the WLAN and the WWAN, based on the call information contained in the activity log.

11 Claims, 11 Drawing Sheets

METHOD AND SYSTEM USING A MOBILITY SERVER FOR HANDOFF OF A MULTI-MODE MOBILE STATION

BACKGROUND

1. Field of the Invention

The present invention relates to telecommunications and, more particularly, to a method and system that uses a mobility server to facilitate call handoffs of a multi-mode mobile station from a first wireless network to a second wireless network.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as IEEE 802.11, Bluetooth, HiperLAN, or HomeRF, have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as IEEE 802.11. Although such multi-mode mobile stations can provide better wireless coverage in more areas by being able to communicate over different wireless networks, they do not necessarily change their network connectivity in a seamless manner. For example, while engaged in a call via a first wireless network, the multi-mode mobile station may move into an area in which the first wireless network no longer provides good wireless coverage but the second wireless network does. In that situation, it would be desirable for the multi-mode mobile station to be able to continue the call via the second wireless network.

Accordingly, there is a need for methods and systems that can facilitate handoffs of multi-mode mobile stations, for example, from a WWAN to a WLAN or vice versa.

SUMMARY

In a first principal aspect, an exemplary embodiment of the present invention provides a method for effecting a handoff of a multi-mode mobile station from a first wireless network to a second wireless network. The multi-mode mobile station has a first interface for wireless communication with the first wireless network and a second interface for wireless communication with the second wireless network. In accordance with the method, a call between the multi-mode mobile station and an endpoint is established such that the call includes a first call leg between the endpoint and an anchor point of a first serving system and a second call leg between the anchor point and the multi-mode mobile station via the first wireless network. Call information regarding the call is stored. The call information includes an identification of the multi-mode mobile station and an identification of the first serving system. A handoff request is received. In response to the handoff request, the first serving system is identified from the call information and a third call leg is established between the anchor point and the multi-mode mobile station via the second wireless network. The second call leg is dropped.

In a second principal aspect, an exemplary embodiment of the present invention provides a system for controlling call handoffs. The system comprises a mobility server that maintains activity logs for multi-mode mobile stations that can communicate with at least a wireless wide area network (WWAN) and a wireless local area network (WLAN). In response to a handoff request from a given one of the multi-mode mobile stations, the mobility server controls establishment of a bearer path for call handoff between the WWAN and the WLAN based on information contained in the activity log for the given multi-mode mobile station.

DETAILED DESCRIPTION OF EXEMPLARY EMBODIMENTS

1. Overview

Figure 1:
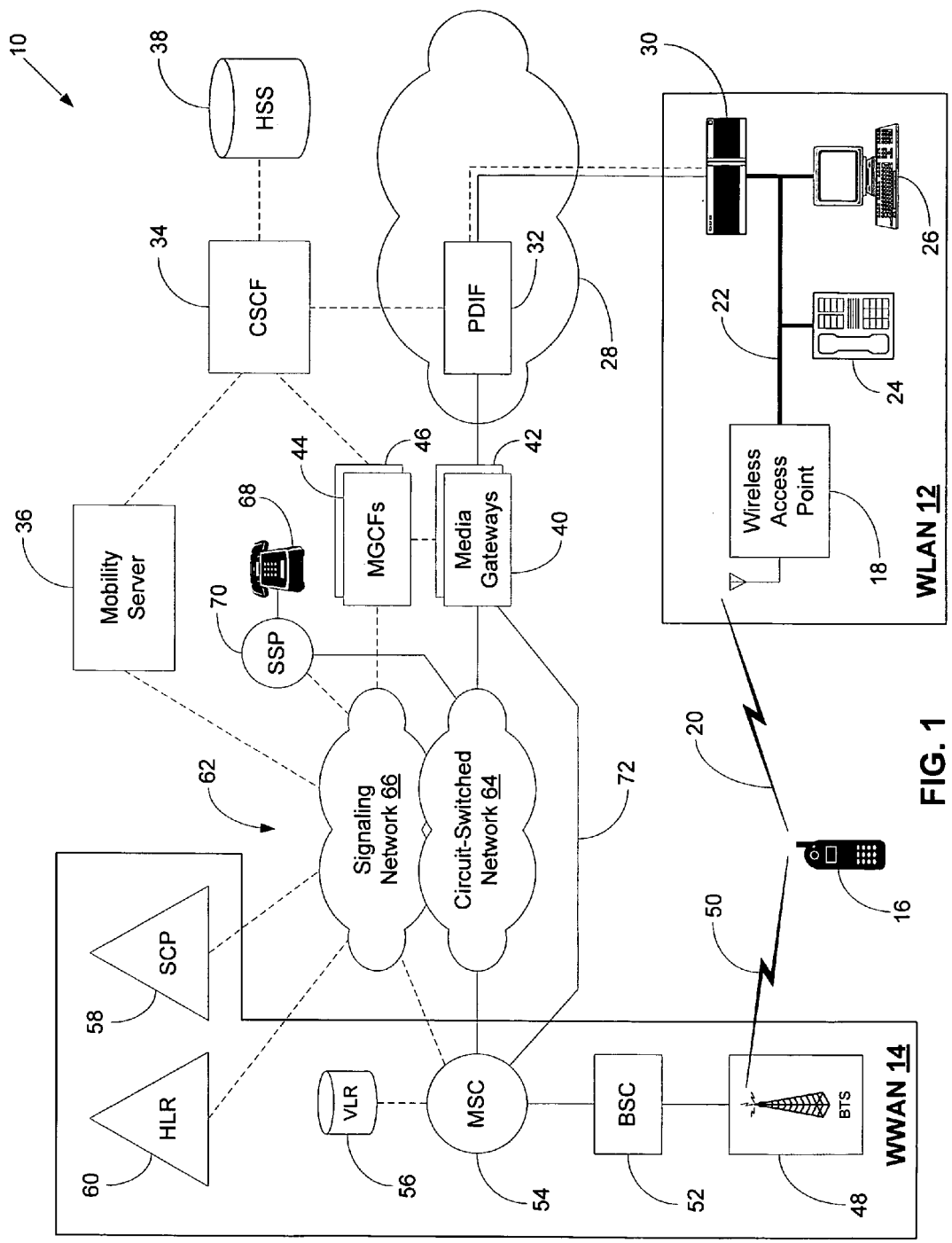
FIG. 1 is a simplified block diagram of a wireless telecommunications system, in accordance with an exemplary embodiment of the present invention.

The present invention, in its preferred embodiments, uses a mobility server to facilitate internetwork call handoffs for multi-mode mobile stations, i.e., handoffs between a first wireless network and a second wireless network. The first and second wireless networks use different wireless communication technologies. For example, the first wireless network could be a wireless local area network (WLAN) that uses a protocol such as IEEE 802.11x, HiperLAN, HomeRF, Bluetooth for wireless communication. The second wireless network could be a wireless wide area network (WWAN) that uses, for example, CDMA or GSM for wireless communication. Thus, a multi-mode mobile station may have at least a first interface for wireless communication with the first wireless network and a second interface for wireless communication with the second wireless network.

The mobility server maintains activity logs for the multi-mode mobile stations, e.g., in a database. An activity log for a multi-mode mobile station may include one or more registration entries, containing information about where the multi-mode mobile station has registered, and one or more call entries, containing information about any calls in which the multi-mode mobile station is involved. Thus, when a multi-mode mobile station registers with the WLAN or the WWAN, the mobility server is informed and creates a registration entry in the multi-mode mobile station's activity log. Similarly, when the multi-mode mobile becomes involved in a call, the mobility server is informed and creates a call entry in the multi-mode mobile station's activity log. In addition, when the multi-mode mobile station cancels a registration or releases a call, the mobility server is informed and removes the corresponding entry from the multi-mode mobile station's activity log.

A call entry in a multi-mode mobile station's activity log may include the mobile directory number (MDN), mobile station identification (MSID), electronic serial number (ESN), and/or other identification of the multi-mode mobile station. The call entry may also include an identification of a serving system for the call. The serving system may include an anchor point through which a bearer path is established for the call. The serving system may also include one or more network elements that control the anchor point. For example, the serving system for a WWAN call may include the mobile switching center (MSC) that is serving the multi-mode mobile station at the time of the call. The serving system for a WLAN call may include a media gateway as the anchor point and may also include a media gateway control function (MGCF) that controls the media gateway and a call session control function (CSCF) that controls the MGCF. A serving system may be identified by any network element that functions as part of the serving system. Thus, a WWAN call entry may include an identification of the serving MSC, e.g., by its IS-41 mobile switching center identification (MSCID). A WLAN call entry may include an identification of the MGCF that controls the anchoring media gateway for the call. The identification could be, for example, an IP address, hostname, and/or SS7 point code of the MGCF.

A call entry may also include other information regarding the call. For example, the call entry may include a session identifier that the serving system uses to identify the call. A call entry may also include a timestamp for the call, e.g., the date and time when the call was established. A call entry may also include an indication whether the call is an outgoing call from the multi-mode mobile station or an incoming call to the multi-mode mobile station.

The mobility server uses the information contained in a multi-mode mobile station's activity log to facilitate call handoffs for the multi-mode mobile station, from the WWAN to the WLAN or vice versa. For example, when the multi-mode mobile station becomes engaged in a WWAN call with an endpoint, the call is established such that the call includes a first call leg between the endpoint and the serving MSC and a second call leg between the serving MSC and the multi-mode mobile station via the WWAN. When the call is established, the serving MSC sends the call information to a service control point (SCP), which, in turn, sends the information to the mobility server. The mobility server then stores the call information as a WWAN call entry in the multi-mode mobile station's activity log.

At some point during the call, the multi-mode mobile station determines that the WLAN is available and preferred. In response, the multi-mode mobile station registers via the WLAN and then transmits a handoff request via the WLAN. The handoff request could be, for example, a request to originate a call to a predetermined directory number that has been reserved for handoff usage. The mobility server is informed of the handoff request and identifies the serving MSC from the call information, i.e., the WWAN call entry, in the multi-mode mobile station's activity log. The mobility server controls the establishment of a bearer path between the serving MSC and a media gateway. In this way, a three-way call is established at the serving MSC, i.e., with a first call leg between the endpoint and the serving MSC, a second call leg between the serving MSC and the multi-mode mobile station via the WWAN, and a third call leg between the serving MSC and the multi-mode mobile station via the WLAN.

Eventually, the multi-mode mobile station drops the second call leg and continues the call using the third call leg, i.e., via the WLAN. In this way, a handoff from the WWAN to the WLAN is effected. Moreover, a "soft" handoff may beneficially be effected, in that the WLAN call leg is preferably established before the WWAN call leg is dropped.

The mobility server may also facilitate call handoffs from the WLAN to the WWAN. For example, when the multi-mode mobile station becomes engaged in a call with an endpoint via the WLAN, the call is established such that the call includes a first call leg between the endpoint and a serving media gateway and a second call leg between the serving media gateway and the multi-mode mobile station via the WLAN. The serving media gateway is the anchor point of a serving system that also includes a serving MGCF and a CSCF. When the call is established, the CSCF sends the call information to the mobility server. The mobility server then stores the call information as a WLAN call entry in the multi-mode mobile station's activity log.

At some point during the call, the multi-mode mobile station determines that the WWAN is available and preferred. In response, the multi-mode mobile station registers via the WWAN and then transmits a handoff request via the WWAN. The handoff request could be, for example, a request to originate a call to a predetermined directory number, e.g., the same handoff number used to request a handoff from the WWAN to the WLAN. An MSC receives the call origination request and routes the call based on the handoff number. For example, the MSC may signal to a handoff MGCF to establish a bearer path to a handoff media gateway. In some cases, the handoff MGCF may also be the serving MGCF and the handoff media gateway may also be the serving media gateway.

The mobility server is informed of the handoff request and identifies the serving MGCF from the call information, i.e., the WLAN call entry, in the multi-mode mobile station's activity log. If the handoff media gateway is not the serving media gateway, then the mobility server requests establishment of a bearer path between the serving media gateway and the handoff media gateway, e.g., by signaling to the serving MGCF and/or handoff MGCF. In this way, a three-way call may be established at the serving media gateway, i.e., with a first call leg between the endpoint and the serving media gateway, a second call leg between the serving media gateway and the multi-mode mobile station via the WLAN, and a third call leg between the serving media gateway and the handoff media gateway that extends to the multi-mode mobile station via the WWAN.

Eventually, the multi-mode mobile station then drops the second call leg and continues the call using the third call leg, i.e., via the WWAN. In this way, a handoff from the WLAN to the WWAN is effected. Moreover, a "soft" handoff may beneficially be effected, in that the WWAN call leg is preferably established before the WLAN call leg is dropped.

2. Exemplary Network Architecture

FIG. 1 is a simplified block diagram of an exemplary wireless telecommunications system 10. In FIG. 1, bearer connections, i.e., connections that carry the voice or other media exchanged during a call, are indicated using solid lines, signaling connections are indicated using dashed lines, and connections that carry both signaling and bearer traffic are indicated by a combination of dashed and solid lines.

Wireless telecommunications system 10 includes network elements that function together as a wireless local area network (WLAN) 12 and network elements that function together as a wireless local area network (WWAN) 14. WLAN 12 may provide wireless coverage in a relatively limited area, such as in a building or part of a building, and may use one or more unlicensed frequency bands, such as the unlicensed frequency band in the 2.4 GHz range. For example, WLAN 12 may use IEEE 802.11a, IEEE 802.11b, IEEE 802.11e, IEEE 802.11g, IEEE 802.11h, or IEEE 802.11n (wherein these and other members of the IEEE 802.11 family of specifications are referred to generically herein as "802.11x"), or variations thereof, for wireless communication. These 802.11x standards are incorporated herein by reference. Alternatively or additionally, WLAN 12 may use IEEE 802.16, Bluetooth, HomeRF, HiperLAN, a Multichannel Multipoint Distribution Service (MMDS), or some other wireless protocol or format for wireless communication.

WWAN 14 may provide wireless coverage in a relatively large geographic area, such as an entire city, for example, by using a plurality of contiguous wireless coverage areas, such as cells or sectors. The wireless communication in WWAN 14 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

A multi-mode mobile station 16 has a first interface for wireless communication with WLAN 12 and a second interface for wireless communication with WWAN 14. Thus, multi-mode mobile station 16 is able to communicate with WLAN 12 when operating in an area served by WLAN 12 and is able to communicate with WWAN 14 when operating in an area served by WWAN 14. In some areas, the wireless coverage of WLAN 12 and WWAN 14 may be overlapping, and multi-mode mobile station 16 may use an arbitration method to determine whether to communicate with WLAN 12 or with WWAN 14.

Multi-mode mobile station 16 may be a wireless telephone, wirelessly-equipped personal digital assistant (PDA), wirelessly-equipped laptop computer, or other type of wireless communication device. The first and second interfaces of multi-mode mobile station 16 may each include an antenna, a radio frequency (RF) transceiver, and a communication module appropriate for communicating using the particular wireless technology. A communication module may be implemented by hardware, firmware, and/or software.

WLAN 12 includes at least one wireless access point 18. Wireless access point 18 provides a wireless coverage area within which wireless access point 18 is able to communicate with wireless communication devices, such as multi-mode mobile station 16, over an air interface 20. Wireless access point 18 may be communicatively coupled to other network elements, e.g., via a local area network (LAN) 22. LAN 22 may carry voice, data, and/or other media in a packet-based format. Thus, LAN 22 may be connected to other communication devices that exchange voice in a packet-based format. For example, LAN 22 may be connected to a voice-over-packet (VoP) telephone 24, a personal computer 26 equipped for audio communication, e.g., equipped with a microphone and speaker, and/or one or more other wireless access points.

LAN 22 may be communicatively coupled to a wide area packet-switched network 28, via a network access device 30. Network access device 30 could be, for example, a cable modem, DSL modem, or router. Packet-switched network 28 may include may include both a public network portion, e.g., the Internet, and a private network portion, e.g., a service provider's own network. Communications involving WLAN 12 may be carried through a public network portion of packet-switched network 28 by means of a virtual private network (VPN) that terminates at a packet data interworking function (PDIF) 32. Thus, as shown in FIG. 1, network access device 30 and PDIF 32 may exchange both signaling and bearer traffic via the VPN. PDIF 32, in turn, may provide access to a private network portion of packet-switched network 28. In this way, communications involving WLAN 12 can remain private as they are carried through packet-switched network 28.

Packet-switched network 28 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 28 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 28. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP:

Session Description Protocol," Request for Comments 2327 (April 1998), which is incorporated herein by reference.

In an exemplary embodiment, SIP is used to set up communication sessions, such as voice-over-packet (VoP) calls, through packet-switched network 28 that involve WLAN 12. Multi-mode mobile station 16 may include its own SIP user agent for SIP signaling. Alternatively, another network element, such as PDIF 32, may engage in SIP signaling on behalf of multi-mode mobile station 16. Although exemplary embodiments are described herein with reference to SIP signaling, it is to be understood that other signaling protocols could be used.

Wireless telecommunications system 10 may use an IP Multimedia Subsystem (IMS) architecture to support VoP communications in packet-switched network 28 and WLAN 12. The IMS approach is described in a number of technical specifications of the 3$^{rd}$ Generation Partnership Project (3GPP), including TS 23.218 version 6.2.0 (2004-09), TS 23.228 version 5.12.0 (2004-03), and TS 24.229 version 6.4.0 (2004-09), which documents are incorporated herein by reference.

In accordance with the IMS approach, wireless telecommunications system 10 may include a call session control function (CSCF) 34 communicatively coupled to packet-switched network 28. CSCF 34 may function as a SIP registrar for registering SIP user agents communicating from WLAN 12 and may function as a SIP proxy server for routing SIP signaling messages to and from WLAN 12. In an exemplary embodiment, PDIF 32 exchanges signaling with CSCF 34, on behalf of WLAN 12.

CSCF 34 may perform these functions in accordance with service logic located in other network elements, e.g., elements described as "application servers" in the IMS approach. In this regard, CSCF 34 may communicate with a mobility server 36 as one such application server, as described in more detail below. Although FIG. 1 shows only one application server, i.e., mobility server 36, it is to be understood that CSCF 34 could be communicatively coupled to multiple application servers.

CSCF 34 may also be communicatively coupled to a home subscriber server (HSS) 38. HSS 38 may store WLAN user profiles for subscribers authorized to use WLAN 12 for VoP or other services. Some of the subscribers may also be authorized to use WWAN 14. Thus, HSS 38 may store a WLAN user profile associated with multi-mode mobile station 16. A WLAN user profile may specify what services the user has subscribed to and, thus, has available via WLAN 12 and may also specify the user's preferences regarding how those services are provided.

A WLAN user profile may include filter criteria that CSCF 34 uses to determine what SIP signaling CSCF 34 should send or proxy to an application server, such as mobility server 36, and under what conditions, in order to provide the services subscribed to by the multi-mode mobile station's user. The filter criteria may also specify which application server the SIP signaling should be sent or proxied to. In an exemplary embodiment, CSCF 34 obtains the WLAN user profile associated with a given multi-mode mobile station when the given multi-mode mobile station registers with CSCF 34, e.g., using the SIP REGISTER method. Then, when CSCF 34 receives signaling from or directed to the given multi-mode mobile station, CSCF 34 applies the filter criteria from the WLAN user profile for the multi-mode mobile station to determine whether the signaling should be sent or proxied to an application server and, if so, which application server.

As described in more detail below, packet-switched network 28 may be communicatively coupled to WWAN 14 via one or more media gateways, such as media gateways 40 and 42. Although FIG. 1 shows two media gateways, it is to be understood that wireless telecommunications system 10 could include a greater or fewer number of media gateways. As described in more detail below, calls involving WLAN 12, e.g., calls originated or received by multi-mode mobile station 16 while communicating via WLAN 12, may be established through these media gateways. The media gateway carries the bearer traffic for the call, i.e., the voice or media exchanged during the call. If the call also involves a circuit-switched network element, the media gateway may convert between the packet-switched media format used in packet-switched network 28, e.g., an RTP format, and the circuit-switched media format used by the circuit-switched network elements, e.g., a time division multiplexed (TDM) format.

Media gateways 40 and 42 may be controlled by one or more media gateway control functions (MGCFs), such as MGCF 44 and 46, e.g., using the Media Gateway Control Protocol (MGCP) or H.248/Megaco. MGCFs 44 and 46, may, in turn, be controlled by CSCF 34, e.g., using SIP signaling. Although FIG. 1 shows two MGCFs, it is to be understood that wireless telecommunications network 10 may include a greater or fewer number of MGCFs, with each MGCF controlling one or more media gateways.

When multi-mode mobile station 16 is engaged in a call via WLAN 12, the bearer traffic for the call goes through a particular media gateway, such as media gateway 40, controlled by a particular MGCF, such as MGCF 44, which, in turn, is controlled by CSCF 34. In this way, media gateway 40, MGCF 44, and CSCF 34, together function as a serving system for that call. For a subsequent call, however, a different media gateway and/or MGCF may be used. Thus, a media gateway and/or MGCF may be allocated on a call-by-call basis.

WWAN 14 may include a base transceiver station (BTS) 48 that provides a wireless coverage area within which BTS 48 may communicate with one or more mobile stations, such as multi-mode mobile station 16, over an air interface 50. Although FIG. 1 shows only one BTS, it is to be understood that WWAN 14 may include a plurality of BTSs that may provide a plurality of wireless coverage areas. The communications between BTS 48 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 48 may be controlled by a base station controller (BSC) 52, which, in turn, may be controlled by a mobile switching center (MSC) 54. Although FIG. 1 shows only one MSC and only one BSC, it is to be understood that WWAN 14 may include a plurality of MSCs, which may, in turn, control a plurality of BTSs, via a plurality of BSCs. MSC 54 also has access to a visitor location register (VLR) 56. VLR 56 stores WWAN user profiles for mobile stations, such as multi-mode mobile station 16, that are being served by MSC 54. Although FIG. 1 shows VLR 56 as a network element separate from MSC 54, VLR 56 may be integrated or co-located with MSC 54.

A WWAN user profile for a mobile station may identify what services the user of the mobile station has subscribed to and, thus, has available via WWAN 14. A WWAN user profile for a mobile station may also include a trigger address list that specifies one or more points during call processing for that mobile station at which MSC 54 should query another network elements, e.g., a service control point (SCP) 58, for call processing instructions. The communications between MSC 54 and SCP 58 may be "Wireless Intelligent Network" (WIN) signaling, e.g., as described in TIA/EIATIS-771, published in July 1999, which is incorporated herein by reference.

MSC 54 may obtain the WWAN user profile for a mobile station, such as multi-mode mobile station 16, from a home location register (HLR) 60, and then store the WWAN user profile in VLR 56, when the mobile station registers with MSC 54. HLR 60 may also perform mobility management functions. For example, HLR 60 may keep track of where mobile stations, such as multi-mode mobile station 16, have most recently registered. The communications between MSC 54 and HLR 60 may conform to IS-41 specifications. A recent revision of the IS-41 specifications, ANSI/TIA/EIA-41-D-97, published in December 1997, is incorporated herein by reference.

MSC 54 may also be connected to the public switched telephone network (PSTN) 62. PSTN 62 may use an out-of-band signaling system, such as Signaling System 7 (SS7) to route calls. Thus, PSTN 62 may include a circuit-switched network 64 that carries bearer traffic, i.e., the voice or other media in calls, and a signaling network 66 that carries signaling traffic used to set up, tear down, monitor, and control calls. Circuit-switched network 64 may include a plurality of trunks, with each trunk carrying media in a TDM format. Signaling system 66 may include a plurality of networked signal transfer points (STPs).

PSTN 62 may also be connected to various landline telephony endpoints, exemplified in FIG. 1 by landline telephone 68. More particularly, landline telephone 68 may be connected to a switching system, such as service switching point (SSP) 70, which, in turn, may have a bearer connection to circuit-switched network 64 and a signaling connection to signaling network 66.

MSC 54 may communicate with signaling network 66, e.g., using SS7, to route calls via circuit-switched network 64 to and from mobile stations being served by WWAN 14, such as multi-mode mobile station 16. MSC 54 may also communicate with SCP 58 and with HLR 60 via signaling network 66. The WIN signaling and IS-41 signaling may be carried in signaling network 66 as an SS7 application layer.

PSTN 62 may also be communicatively coupled to network elements that are communicatively coupled to packet-switched network 28. In particular, mobility server 36 may be communicatively coupled to signaling network 66, e.g., to engage in IS-41 signaling with HLR 60. Media gateways 40 and 42 may be communicatively coupled to circuit-switched network 64. Media gateways 40 and 42 may also be communicatively coupled to MSCs, such as MSC 54 via intermachine trunks, such as IMT 72. MGCFs 44 and 46 may be communicatively coupled to signaling network 66 to route calls to and from media gateways 40 and 42 through PSTN 62, e.g., using SS7 signaling. In this way, MGCFs 44 and 46 may, under the control of CSCF 34, manage communication sessions through media gateways 40 and 42, e.g., calls with calls legs that extend through both PSTN 62 and packet-switched network 28, converting between the SS7 signaling used in signaling network 66 and the SIP signaling used by CSCF 34.

3. Exemplary Operation

In an exemplary embodiment, mobility server 36 maintains in a database activity logs for multi-mode mobile stations, such as multi-mode mobile station 16. An activity log for a multi-mode mobile station may include information regarding the multi-mode mobile station's registrations and information regarding any calls in which the multi-mode mobile station may be involved. Mobility server 36 then uses the information in a multi-mode mobile station's activity log to facilitate internetwork call handoffs for that multi-mode mobile station, from WLAN 12 to WWAN 14 or vice versa. FIGS. 2 through 11 illustrate exemplary methods by which mobility server 36 can obtain registration information and call information to update a multi-mode mobile station's activity log and then use that information to facilitate internetwork call handoff. The examples of FIGS. 2 through 11 assume the network architecture of FIG. 1. However, it is to be understood that other network architectures could be used.

a. Registration

Figure 2:
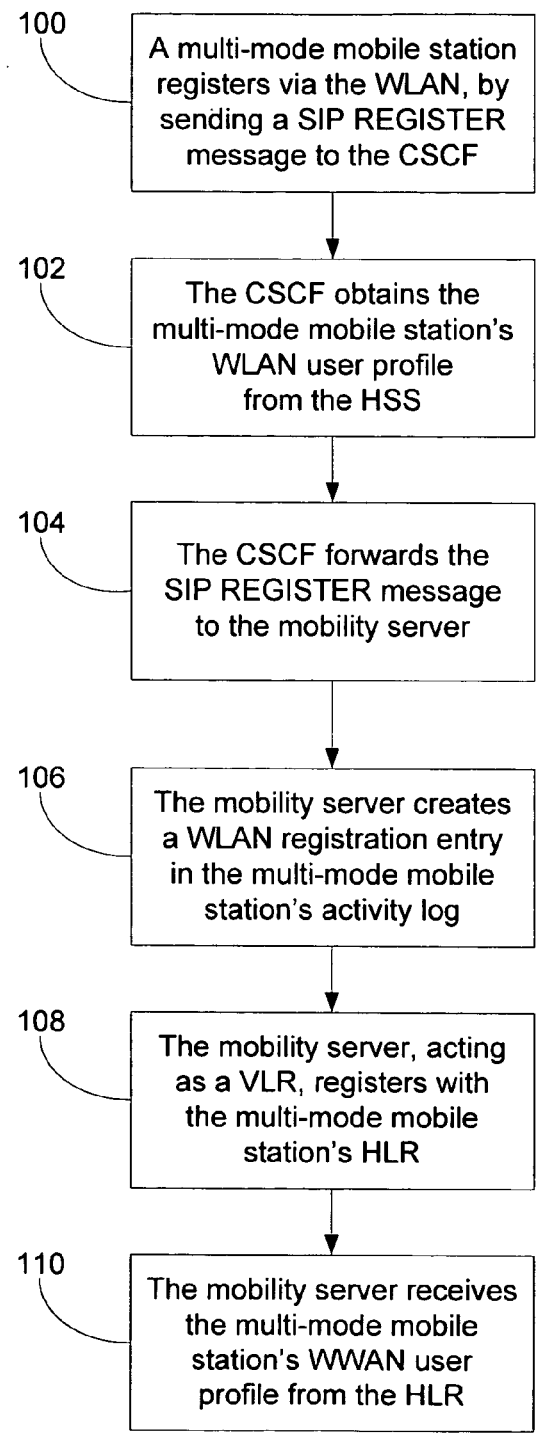
FIG. 2 is a flow chart illustrating a WLAN registration process for a multi-mode mobile station, in accordance with an exemplary embodiment of the present invention.

FIG. 2 is a flow chart illustrating an example in which a multi-mode mode mobile station, such as multi-mode mobile station 16, registers via the WLAN. The process may begin when the multi-mode mobile station sends a SIP REGISTER message to the CSCF, via the WLAN, as indicated by block 100. The CSCF receives the SIP REGISTER message and, in response, obtains the multi-mode mobile station's WLAN user profile from the HSS, as indicated by block 102. In this case, the WLAN user profile includes filter criteria indicating that the CSCF should invoke the mobility server as an application server for registration. Thus, the CSCF forwards the SIP REGISTER message to the mobility server, as indicated by block 104.

In response, the mobility server creates a registration entry in the multi-mode mobile station's activity, as indicated by block 106. The registration entry includes an identification of the multi-mode mobile station, e.g., its MDN, MSID, and or ESN. The registration entry may also include a code to indicate that the entry reflects a WLAN registration event. The code could include, for example, a designation, such as "reg-WLAN," and/or an identification of a network element involved in the WLAN registration, such as an IP address of the CSCF. In addition, the registration entry may include a timestamp, i.e., the time and date of the WLAN registration, as well as other information.

The mobility server may also act like a VLR in response to the SIP REGISTER message, by registering with the multi-mode mobile station's HLR, e.g., HLR 60, as indicated by block 108. To do this, the mobility server may generate an IS-41 Registration Notification (REGNOT) message, e.g., based on the information contained in the SIP REGISTER message, and send the IS-41 REGNOT message to the HLR. The IS-41 REGNOT message may include an MDN or other identification of the multi-mode mobile station. The IS-41 REGNOT message may also include an identification of the serving system currently serving the multi-mode mobile station, e.g., an MSCID that identifies the mobility server. In this way, the HLR is informed of the current location of the multi-mode mobile station. The mobility server may receive a response from the HLR to the IS-41 REGNOT message, which response may include a WWAN user profile for the multi-mode mobile station, as indicated by block 110.

Figure 3:
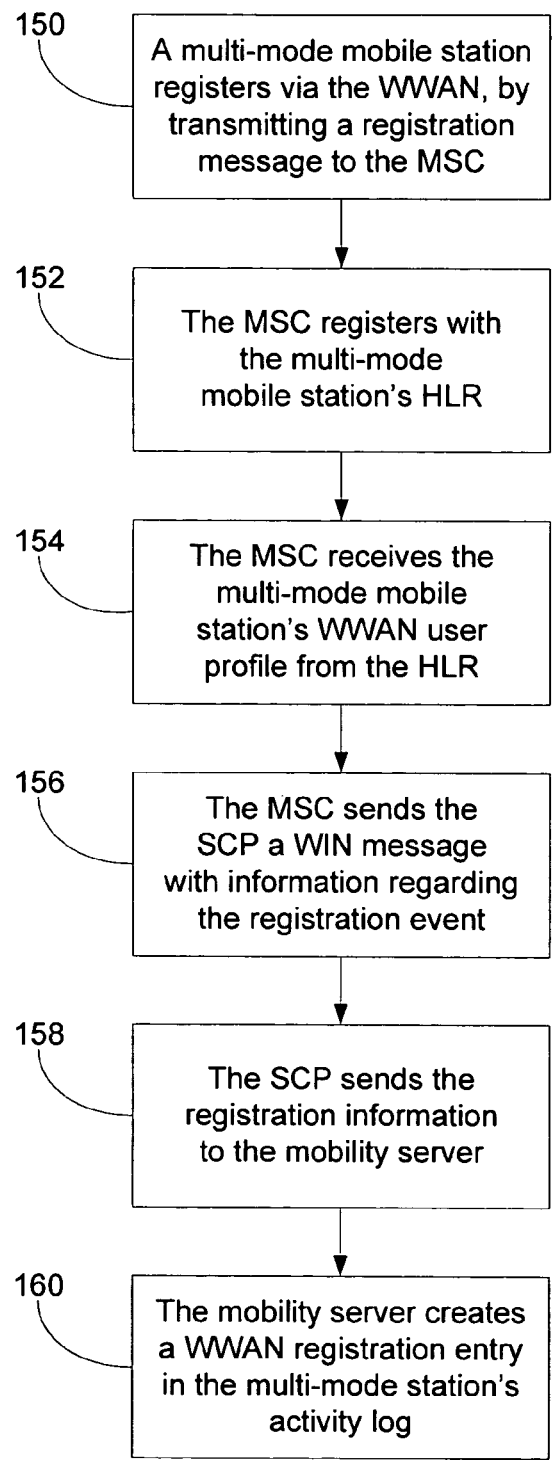
FIG. 3 is a flow chart illustrating a WWAN registration process for a multi-mode mobile station, in accordance with an exemplary embodiment of the present invention.

FIG. 3 is a flow chart illustrating an example in which a multi-mode mode mobile station, such as multi-mode mobile station 16, registers via the WWAN. The process may begin when the multi-mode mobile station transmits a registration message to an MSC, as indicated by block 150. For example, multi-mode mobile station 16 may transmit a registration message over air interface 50 that is then received by MSC 54, via BTS 48 and BSC 52. The MSC then registers with the multi-mode mobile station's HLR, as indicated by block 152. For example, MSC 54 may send an IS-41 REGNOT message to HLR 60, via signaling network 66. In response, the MSC receives the multi-mode mobile station's WWAN user profile from the HLR, as indicated by block 154.

The WWAN user profile includes a trigger address list that defines trigger points at which the MSC should signal to another network element. A WIN trigger at the MS_Registered Detection Point may be used. In this regard, the trigger address list causes the MSC to send a new WIN MSREG (MS Registered) invoke message with information regarding the registration event to an SCP, e.g., SCP 58, as indicated by block 156. Alternatively, a WIN SERVREQ (Service Request) invoke message may be used. The WIN invoke message may identify the multi-mode mobile station, e.g., by MDN, MSID, and/or ESN, and may identify the MSC, e.g., by MSCID. The SCP then sends the registration information to the mobility server, as indicated by block 158. The SCP may do this by forwarding the WIN invoke message received from the MSC to the mobility server. Alternatively, the SCP may send a WIN SERVREQ (Service Request) invoke message to the mobility server.

The mobility server receives the registration information and uses the information to create a WWAN registration entry in the multi-mode mobile station's activity log, as indicated by block 160. The registration entry includes an identification of the multi-mode mobile station, e.g., its MDN, MSID, and or ESN and an identification of the MSC, e.g., its MSCID. The registration entry may also include a code to indicate that the entry reflects a registration via an MSC. The code could include, for example, a designation, such as "regMSC," and/or an identification of a network element involved in the registration, such as the MSCID of the MSC. In addition, the registration entry may include a timestamp, i.e., the time and date of the WWAN registration, as well as other information.

The mobility server may also be informed when a multi-mode mobile station's registration is canceled. For example, when a multi-mode mobile station's WLAN registration is canceled, the CSCF may notify the mobility server, which then removes its WLAN registration entry from the multi-mode mobile station's activity log. When a multi-mode mobile station's WWAN registration is canceled, the MSC that had been serving the multi-mode mobile stations encounters to trigger that causes it to send de-registration information to the SCP. The de-registration information may include an identification of the multi-mode mobile station, e.g., its MDN, MSID, and/or ESN and an identification of the MSC, e.g., its MSCID. The SCP then forwards this information to the mobility server, along with an indication signifying a de-registration event. The mobility server then removes the WWAN registration entry from the multi-mode mobile station's activity log.

b. Incoming and Outgoing Calls

Figure 4:
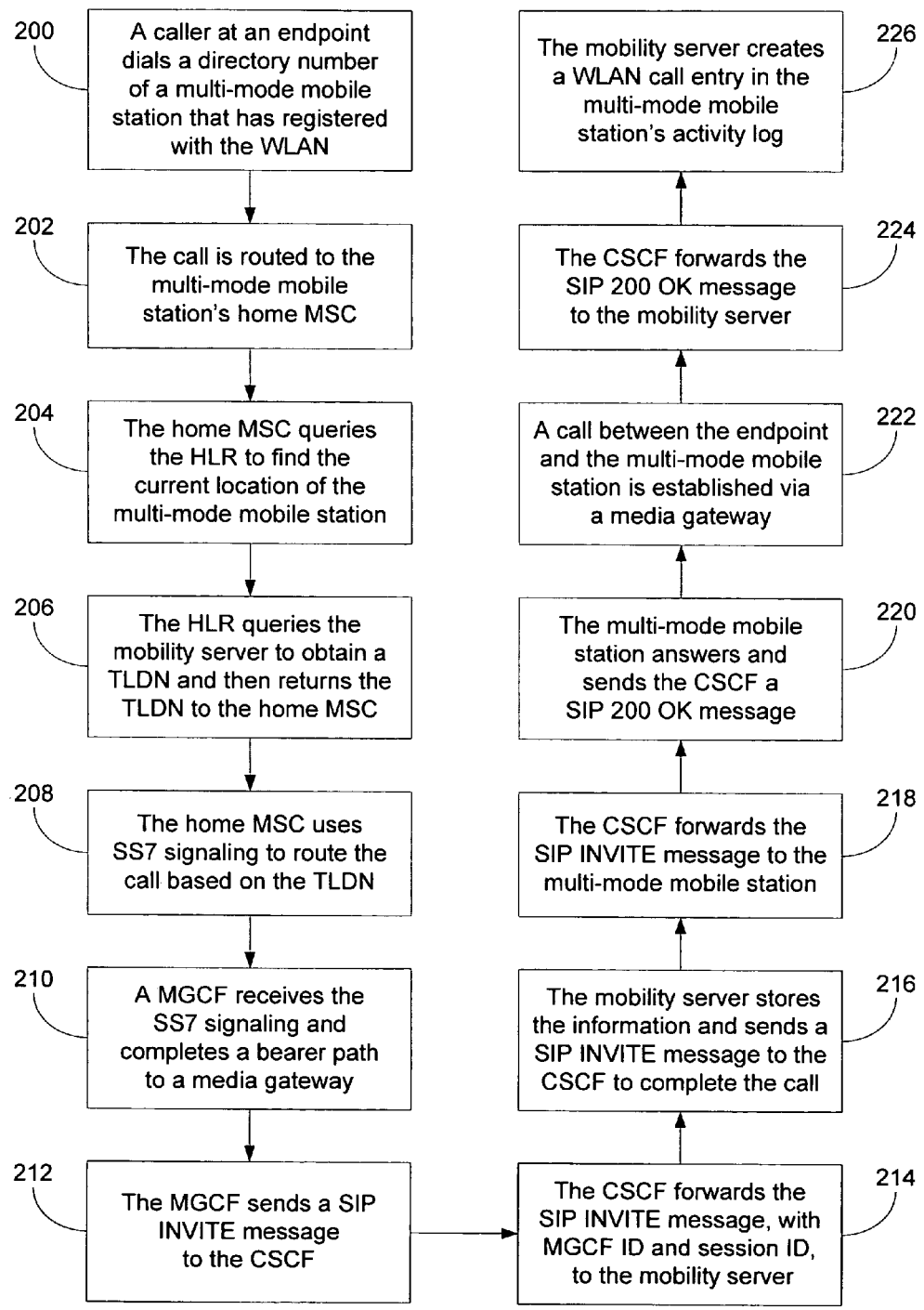
FIG. 4 is a flow chart illustrating a method of establishing an incoming call to a multi-mode mobile station via a WLAN, in accordance with an exemplary embodiment of the present invention.

The mobility server also keeps track of incoming calls to multi-mode mobile station and outgoing calls from multi-mode mobile stations. FIG. 4 is a flow chart illustrating an example of a multi-mode mobile station receiving an incoming call via the WLAN. The process may begin when a caller at an endpoint dials a directory number of a multi-mode mobile station that has registered with the WLAN, as indicated by block 200. The endpoint could be any telephony or other communication device communicatively coupled to PSTN 62 or to packet-switched network 28, via either a wireless or wireline connection. For purposes of illustration, however, this example assumes that the endpoint is landline telephone 68.

The multi-mode mobile station's directory number is associated with the multi-mode mobile station's home MSC, e.g., MSC 54. Thus, the call from the endpoint is routed through the PSTN to the multi-mode mobile station's home MSC, as indicated by block 202. In this example, the multi-mode mobile station is not currently being served by its home MSC. Thus, the home MSC queries the multi-mode mobile station's HLR to find the multi-mode mobile station's current location, as indicated by block 204. For example, MSC 54 may send HLR 60 an IS-41 LOCREQ message that identifies the multi-mode mobile station.

In response to the IS-41 LOCREQ message, the HLR checks its data record for the multi-mode mobile station and determines that the most recent registration was from the mobility server. The HLR then queries the mobility server to obtain a temporary local directory number (TLDN) that can be used to route the call to the multi-mode mobile station, as indicated by block 206. For example, the HLR may send the mobility server an IS-41 ROUTEREQ message that identifies the multi-mode mobile station. In response, the mobility server selects a TLDN from a pool of available directory numbers and provides the HLR with the selected TLDN in response to the IS-41 ROUTEREQ message. The HLR then forwards the TLDN to the home MSC in response to the IS-41 LOCREQ message, as indicated by block 206.

The home MSC receives the TLDN and uses SS7 signaling to route the call based on the TLDN, as indicated by block 208. The TLDN maps to a point code of a MGCF, such as MGCF 44. Thus, a MGCF receives the SS7 signaling for the call and completes a bearer path to a media gateway, as indicated by block 210. With reference to FIG. 1, the bearer path could, for example, extend from MSC 54 to media gateway 40, via circuit-switched network 64 or IMT 72.

The MGCF also generates a SIP INVITE message, e.g., based on the information contained in the SS7 message, and sends the SIP INVITE message to the CSCF, as indicated by block 212. The CSCF then forwards the SIP INVITE message to the mobility server, along with an identification of the MGCF and a session identifier that the MGCF uses to identify the call, as indicated by block 214. The CSCF may send this information based, for example, on the filter criteria contained in the multi-mode mobile station's WLAN user profile.

The mobility server stores the information from the CSCF and sends the CSCF a SIP INVITE message that the CSCF can used to complete the call to the multi-mode mobile station, as indicated by block 216. The CSCF then forwards the SIP INVITE message to the multi-mode mobile station, as indicated by block 218. The multi-mode mobile station receives the SIP INVITE message and, in response, generates a user-discernible alert indication, such as a ringtone, to alert the user of the incoming call.

In this example, the user answers the call. Thus, the multi-mode mobile station sends a SIP 200 OK message to the CSCF, as indicated by block 220. In this way, a call between the endpoint and the multi-mode mobile station is established via a media gateway, as indicated by block 222. The CSCF also informs the mobility server that the call has been established. For example, the CSCF may forward the SIP 200 OK message from multi-mode mobile station to the mobility server, as indicated by block 224.

Once the mobility server is informed that the incoming call to the multi-mode mobile station has been completed, the mobility server creates a WLAN call entry in the multi-mode mobile station's activity log, as indicated by block 226. The WLAN call entry includes an identification of the multi-mode mobile station, e.g., its MDN, MSID, and/or ESN, an identification of the MGCF, and a session identifier that the MGCF uses to identify the call. The WLAN call entry may also include a designation, such as "in," to indicate that this is an incoming call to the multi-mode mobile station. In addition, the WLAN call entry may include a timestamp, i.e., the time and date of the call, as well as other information.

Figure 5:
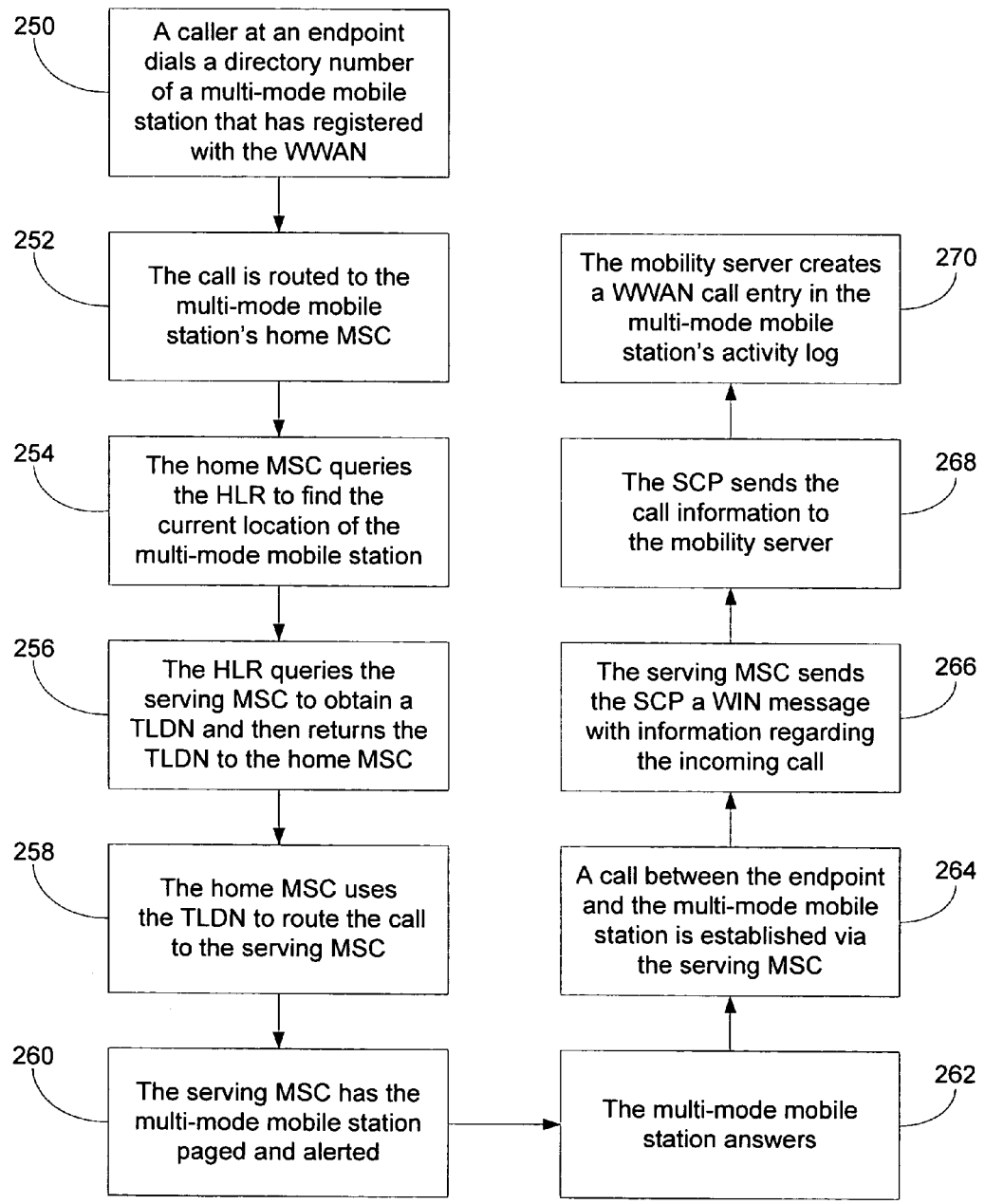
FIG. 5 is a flow chart illustrating a method of establishing an incoming call to a multi-mode mobile station via a WWAN, in accordance with an exemplary embodiment of the present invention.

FIG. 5 is a flow chart illustrating an example of a multi-mode mobile station receiving an incoming call via the WWAN. The process may begin when a caller at an endpoint dials a directory number of a multi-mode mobile station that has registered with the WWAN, as indicated by block 250. For purposes of illustration, this example assumes that the endpoint is landline telephone 68. However, it is to be understood that the endpoint could be any telephony or other communication device communicatively coupled to PSTN 62 or to packet-switched network 28, via either a wireless or wireline connection.

Because the multi-mode mobile station's directory number is associated with the home MSC, the call is routed to the multi-mode mobile station's home MSC, as indicated by block 252. In some cases, the multi-mode mobile station may be operating in an area served by its home MSC. For purposes of illustration, however, this example assumes that the multi-mode mobile station is being served by a different MSC in the WWAN. Thus, in response to the incoming call, the home MSC queries the multi-mode mobile station's HLR to find the multi-mode mobile station's current location, as indicated by block 254. For example, the home MSC may send an IS-41 LOCREQ message to the HLR.

The HLR checks the multi-mode mobile station's data record to find the MSC that is currently serving the multi-mode mobile station. The HLR then queries this serving MSC to obtain a TLDN, e.g., using an IS-41 ROUTEREQ message, and returns the TLDN to the home MSC, as indicated by block 256. The home MSC then uses the TLDN to route the call to the serving MSC, as indicated by block 258.

The serving MSC receives the incoming call and, in response, has the multi-mode mobile station paged and alerted, as indicated by block 260. The multi-mode mobile station then answers the call, as indicated by block 262. In this way, a call between the endpoint and the multi-mode mobile station is established via the serving MSC, as indicated by block 264.

When the call is completed, the serving MSC encounters a trigger at the T_Answer Detection Point, i.e., based on the multi-mode mobile station's WWAN user profile, that causes it to send a new WIN TANSWER invoke message to the SCP with information regarding the call, as indicated by block 266. The call information may include an identification of the multi-mode mobile station, e.g., its MDN, MSCID, and/or ESN, an identification of the serving MSC, e.g., its MSCID, and a session identifier that the serving MSC uses to identify the call. The SCP then sends the call information to the mobility server, as indicated by block 268. The SCP may do this by forwarding the WIN invoke message received from the MSC to the mobility server. Alternatively, the SCP may send a WIN SERVREQ invoke message to the mobility server.

The mobility server receives the call information and uses it to create a WWAN call entry in the multi-mode mobile station's activity log, as indicated by block 270. The WWAN call entry includes the identification of the multi-mode mobile station, e.g., its MDN, MSCID, and/or ESN, the identification of the serving MSC, e.g., its MSCID, and the session identifier. The WWAN call entry may also include a designation, such as "in," to indicate that this is an incoming call to the multi-mode mobile station. In addition, the WWAN call entry may also include a timestamp, i.e., the time and date of the call, as well as other information.

Figure 6:
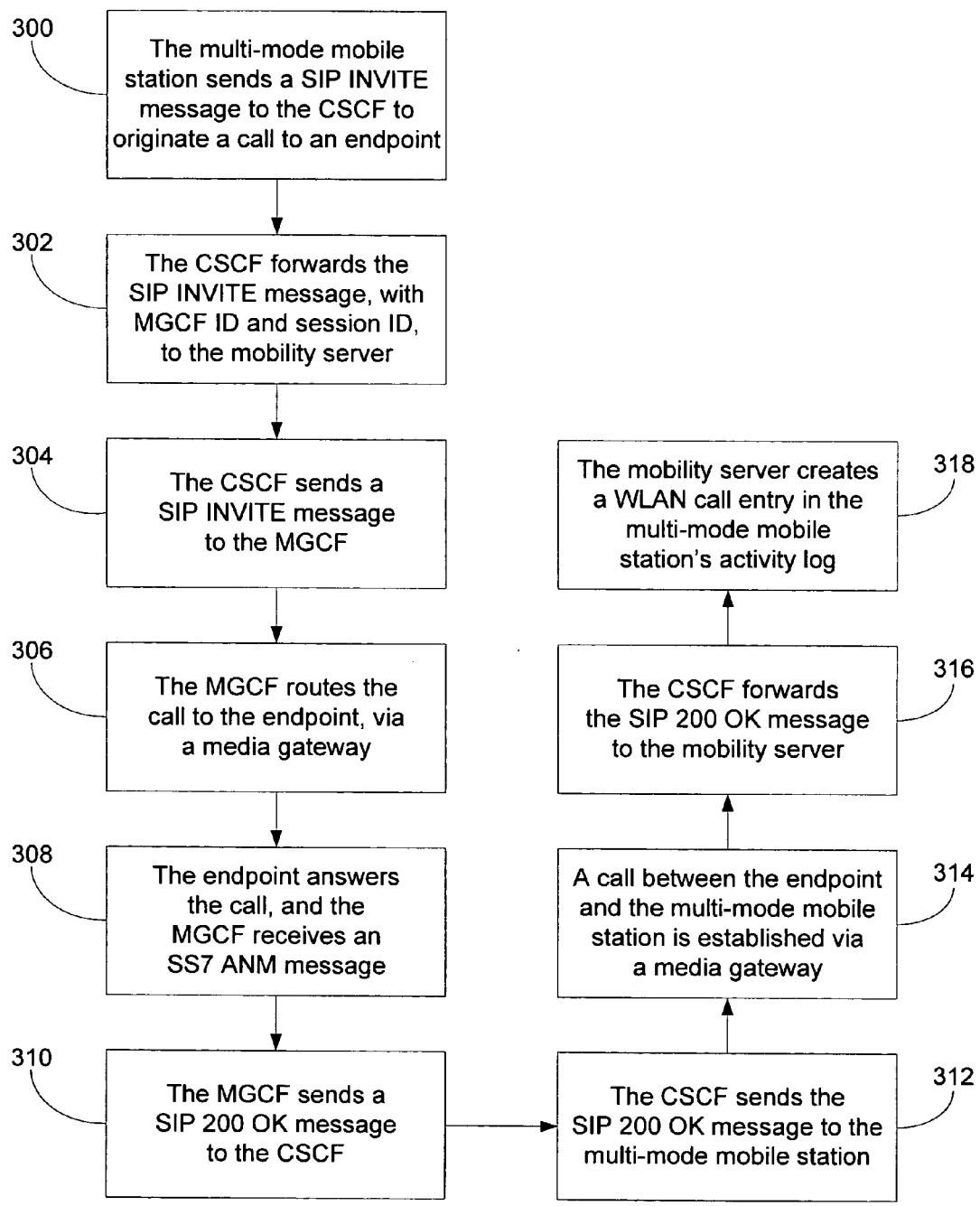
FIG. 6 is a flow chart illustrating a method of establishing an outgoing call from a multi-mode mobile station via a WLAN, in accordance with an exemplary embodiment of the present invention.

The mobility server is also informed of outgoing calls from multi-mode mobile stations. FIG. 6 is a flow illustrating an example in which a multi-mode mobile station originates a call via the WLAN. The process may begin when the multi-mode mobile station sends a SIP INVITE message to the CSCF to originate a call to an endpoint, as indicated by block 300. The endpoint could by any telephony or other communication device that is communicatively coupled to packet-switched network 28 or to PSTN 62 via either a wireless or wireline connection. For purposes of illustration, this example assumes that the endpoint is landline telephone 68.

The CSCF forwards the SIP INVITE message to the mobility server, along with an identification of the MGCF and the session identifier to be used for the call, in order to inform the mobility server of the outgoing call, as indicated by block 302. The CSCF may do this, for example, based on the filter criteria in the multi-mode mobile station's WLAN user profile. The mobility server stores this information from the CSCF. The mobility server may return the same SIP INVITE message to the CSCF, and the CSCF may continue to process the SIP INVITE message.

Thus, the CSCF sends the SIP INVITE message to the MGCF in order to route the call to the endpoint, as indicated by block 304. The MGCF maps the SIP INVITE message into SS7 signaling to route the call to the endpoint via a media gateway, as indicated by block 306. In this example, the endpoint answers the call, so the MGCF receives an SS7 Answer Message (ANM), as indicated by block 308. The MGCF maps the SS7 ANM message to a SIP 200 OK message, which the MGCF sends to the CSCF, as indicated by block 310. The CSCF, in turn, forwards the SIP 200 OK message to the multi-mode mobile station, as indicated by block 312. In this way, a call between the endpoint and the multi-mode mobile station is established via a media gateway, as indicated by block 314.

The CSCF also informs the mobility server when the outgoing call is established, e.g., by forwarding the SIP 200 OK message to the mobility server, as indicated by block 316. The mobility server then creates a WLAN call entry in the multi-mode mobile station's activity log, as indicated by block 318. The WLAN call entry includes an identification of the multi-mode mobile station, e.g., its MDN, MSID, and/or ESN, the MGCF identification, the session identifier, and a timestamp (i.e., the time and date of the call). The WLAN call entry may also include a designation, such as "out," indicating the call is outgoing from the multi-mode mobile station, and may also include other information.

Figure 7:
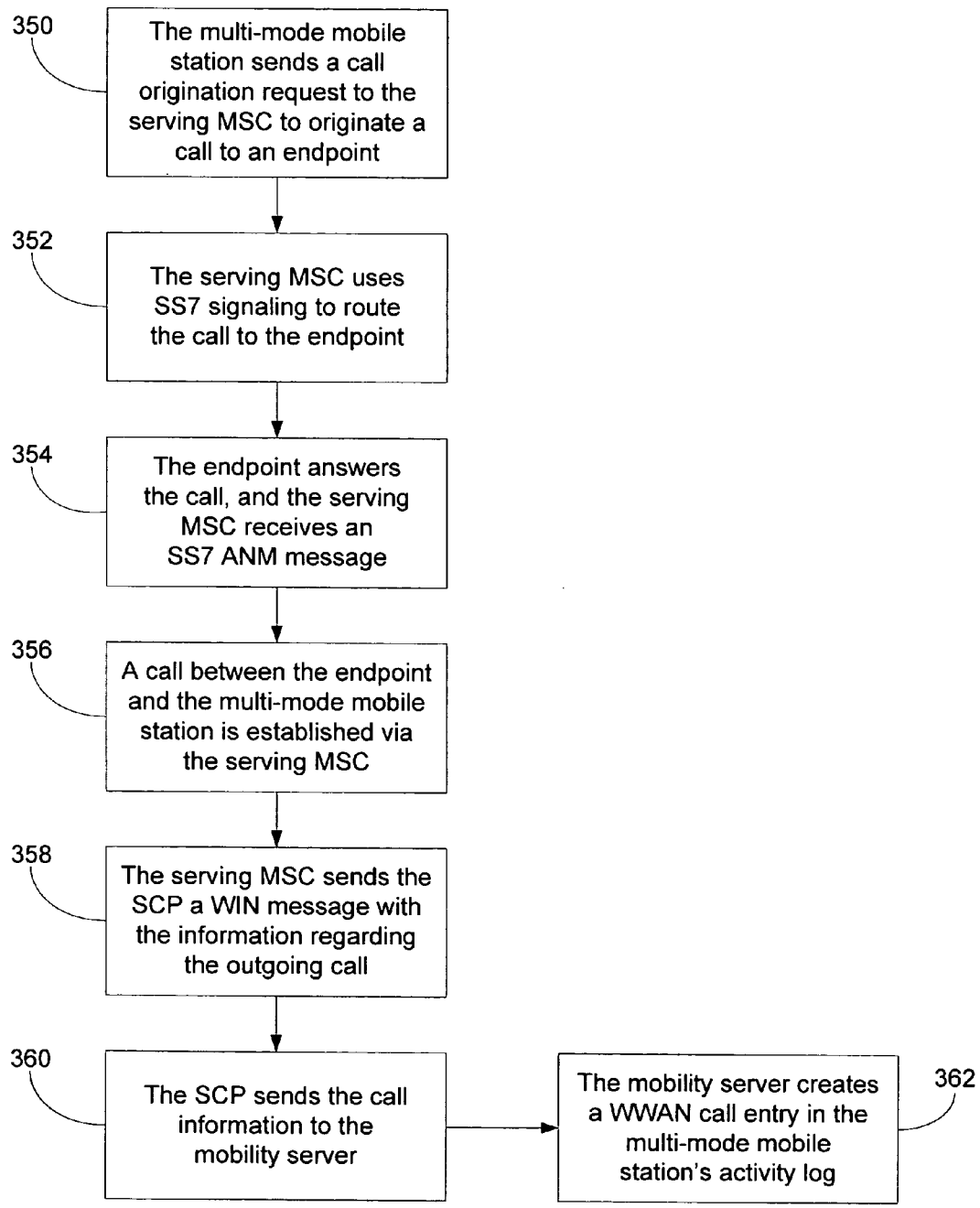
FIG. 7 is a flow chart illustrating a method of establishing an outgoing call from a multi-mode mobile station via a WWAN, in accordance with an exemplary embodiment of the present invention.

FIG. 7 is a flowchart illustrating an example in which a multi-mode mobile station originates a call via the WWAN. The process may begin when the multi-mode mobile station sends a call origination request to the serving MSC to originate a call to an endpoint, as indicated by block 350. For purposes of illustration, the endpoint is assumed in this example to be landline telephone 68. However, it is to be understood, that the endpoint could be any telephony or other communication device communicatively coupled to PSTN 62 or packet-switched network 28.

In response to the multi-mode mobile station's request, the serving MSC uses SS7 signaling to route the call to the endpoint, as indicated by block 352. The endpoint answers the call and, as a result, the serving MSC receives an SS7 ANM message, as indicated by block 354. In this way, a call between the endpoint and the multi-mode mobile station is established via the serving MSC, as indicated by block 356.

When the call is established, the serving MSC encounters a trigger at the O_Answer Detection Point, i.e., based on the multi-mode mobile station's WWAN user profile, that causes it to send a new WIN OANSWER invoke message to the SCP with information regarding the outgoing call, as indicated by block 358. The call information includes an identification of the multi-mode mobile station, e.g., its MDN, MSID, and/or ESN, an identification of the serving MSC, e.g., its MSCID, and a session identifier that the serving MSC uses to identify the call. The SCP then sends the call information to the mobility server, as indicated by block 360. The SCP may do this by forwarding the WIN invoke message received from the MSC to the mobility server. Alternatively, the SCP may send a WIN SERVREQ (Service Request) invoke message to the mobility server.

The mobility server receives the call information and uses it to create a WWAN call entry in the multi-mode mobile station's activity log, as indicated by block 362. Thus, the WWAN call entry includes the identification of the multi-mode mobile station, e.g., its MDN, MSID, and/or ESN, the identification of the serving MSC, e.g., its MSCID, and the session identifier. The WWAN call entry may also include a designation, such as "out," that indicates that the call is outgoing from the multi-mode mobile station. The WWAN call entry may also include a timestamp, e.g., the time and date of the call, as well as other information.

The mobility server may also be informed when a call involving multi-mode mobile station is released. For example, when a WLAN call involving a multi-mode mobile station is released, the CSCF may notify the mobility server, which then removes the WLAN call entry from the multi-mode mobile station's activity log. When a WWAN call involving a multi-mode mobile station is released, the serving MSC encounters a trigger that causes it to send call release information to the SCP. The call release information may include an identification of the multi-mode mobile station, e.g., its MDN, MSID, and/or ESN, an identification of the serving MSC, e.g., its MSCID, and a session identifier that the serving MSC used to identify the call. The SCP then forwards the call release information to the mobility server, along with an indication that the call has been released. The mobility server receives the call release information and removes the WWAN call entry from the multi-mode mobile station's activity log.

c. Call Handoffs

Figure 8:
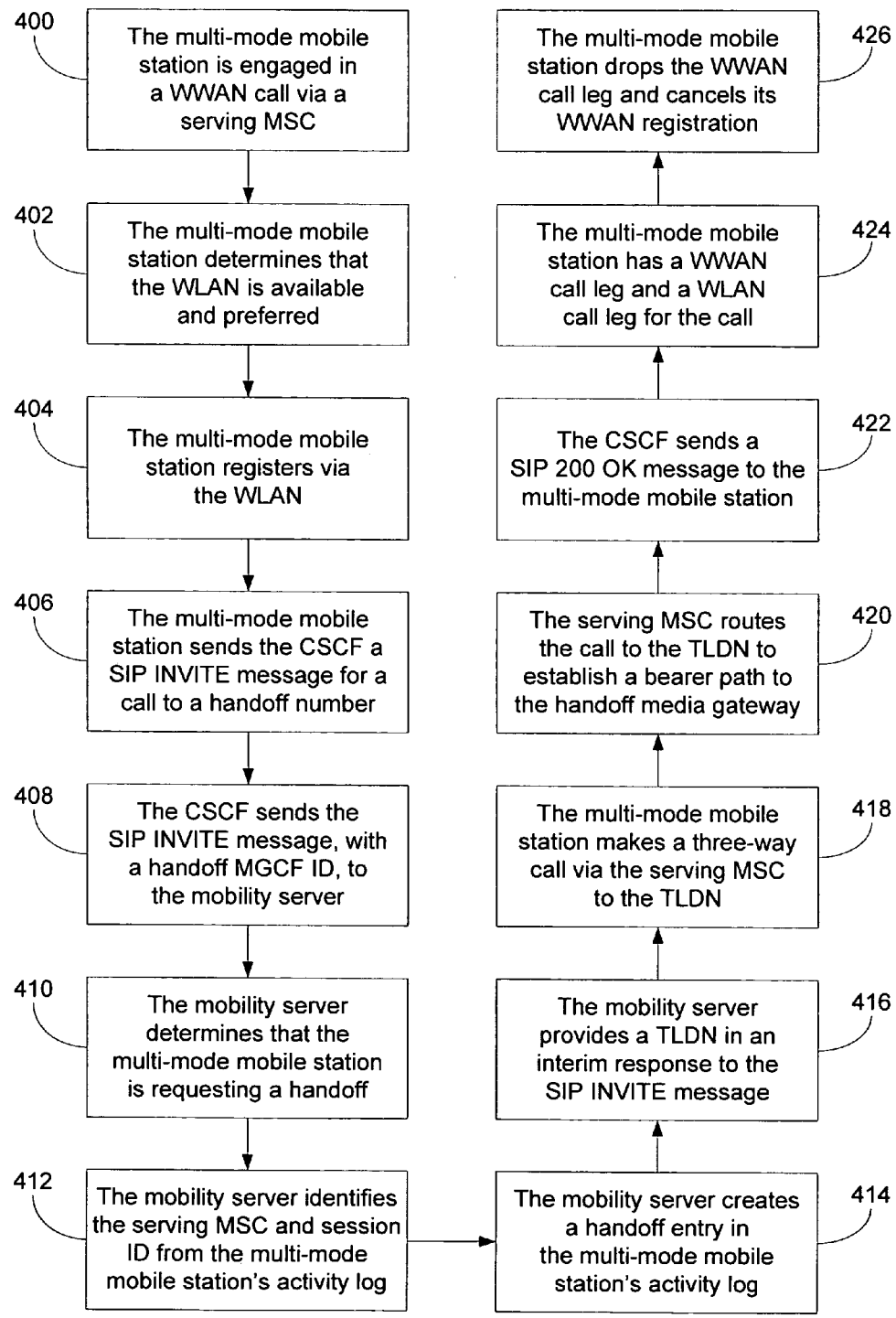
FIG. 8 is a flow chart illustrating a method for call handoff from a WWAN to a WLAN, in accordance with an exemplary embodiment of the present invention.

The mobility server uses the registration information and call information contained in the multi-mode mobile stations' activity logs to facilitate call handoffs from the WWAN to the WLAN and vice versa. FIG. 8 is a flow chart illustrating an exemplary call handoff from the WWAN to the WLAN. The process may begin when the multi-mode mobile station is engaged in a WWAN call with an endpoint via a serving MSC, as indicated by block 400. The call may have been originated by either the endpoint or by the multi-mode mobile station.

At some point during the call, the multi-mode mobile station determines that the WLAN is available and preferred, as indicated by block 402. The multi-mode mobile station may use any of various methods to determine when to check for availability of the other wireless network. In some cases, the multi-mode mobile station may periodically check for availability, or it may do so at the instance of the user. Alternatively, a triggering event may cause the multi-mode mobile station to determine that it should check for availability of the second wireless network. For example, the multi-mode mobile station may use information about its location or movement to determine when to check for availability of the second wireless network. Examples of such approaches are described in U.S. patent application Ser. No. 10/391,158, filed Mar. 18, 2003, titled "Method for Determining Availability of a Radio Network," in U.S. patent application Ser. No. 10/629,406, filed Jul. 29, 2003, titled "Method for Determining Availability of a Radio Network," and in U.S. patent application Ser. No. 10/980,727, titled "Method and System for Triggering Events in a Wireless Network," filed Nov. 3, 2004, which applications are incorporated herein by reference. Once the multi-mode mobile station determines that the other wireless network is available, the multi-mode mobile station may then determine whether it is preferred. The determination that the other wireless network is preferred could be based on pre-set preferences and/or could depend on various criteria, such as the quality of the link and/or the availability of desired services (e.g., voice service) using the other wireless network.

After the multi-mode mobile station determines that the WLAN is available and preferred, the multi-mode mobile station registers via the WLAN, as indicated by block 404. The WLAN registration process may occur as set forth in FIG. 2. Thus, the WLAN registration process results in the creation of a WLAN registration entry in the multi-mode mobile station's activity log.

After registering with the WLAN, the multi-mode mobile station sends the CSCF a SIP INVITE message to originate a call to a handoff number, as indicated by block 406. The "handoff number" could be, for example, a predetermined directory number that multi-mode mobile stations use for handoffs from the WWAN to the WLAN (and may also be used for handoffs from the WLAN to the WWAN). The CSCF forwards the SIP INVITE message to the mobility server, along with an identification of a MGCF to be used for the handoff, as indicated by block 408.

The mobility server receives this information and determines that the multi-mode mobile station is requesting a handoff, as indicated by block 410. In an exemplary embodiment, the mobility server determines that a handoff is being requested based on the handoff number included in the SIP INVITE message. However, the mobility server may also validate the handoff request based on the entries in the multi-mode mobile station's activity log. In particular, the multi-mode mobile station's activity log would be expected to contain three entries: (1) a WWAN registration entry; (2) a WWAN call entry; and (3) a WLAN registration entry. Thus, the mobility server might validate the handoff request only if all three of these entries are present. If any of these entries is absent, the mobility server may indicate an error condition.

If the mobility server is able to validate the handoff request, the mobility server then identifies the serving MSC and retrieves the session identifier from the multi-mode mobile station's activity log, as indicated by block 412. In particular, the mobility server may obtain the MSCID of the serving MSC and the session identifier that the serving MSC uses to identify the WWAN call from the WWAN call entry. The mobility server may then create a handoff entry in the multi-mode mobile station's activity log, as indicated by block 414. The handoff entry includes an identification of the multi-mode mobile station, e.g., its MDN, MSID, and/or ESN, an identification of the handoff MGCF, the MSCID of the serving MSC, and the session identifier. The handoff entry may also include a designation, such as "HO_thru_MSC," to indicate a WWAN to WLAN handoff. In addition, the handoff entry may include a timestamp, as well as other information.

The mobility server then controls establishment of a bearer path for the WWAN to WLAN handoff. In one approach, the mobility server may instruct the handoff MGCF to establish a call leg from a handoff media gateway to the serving MSC so that the call leg is joined to the existing call between the endpoint and the multi-mode mobile station, i.e., the call identified by the session identifier in the WWAN call entry. To accomplish this, the handoff MGCF may send signaling to the serving MSC that invokes an operator service function. The operator service function is normally used to allow an operator to break into an existing call. In this case, however, the operator service function would be used to instruct the serving MSC to join the call leg from the handoff media gateway to the existing call. In this way, a three-way call may be established at the serving MSC.

In an alternative approach, which is described in detail below, the mobility server has the multi-mode mobile station initiate a three-way call. To accomplish this, the mobility server may assign a temporary local directory number (TLDN) that the multi-mode mobile station can call from the WWAN to establish a bearer path to the WLAN for handoff. Thus, the TLDN may route to a handoff MGCF to establish a bearer path from the serving MSC to a handoff media gateway controlled by the handoff MGCF. The mobility server provides the TLDN in an interim response to the SIP INVITE message, as indicated by block 416. The interim response could be, for example, a SIP 183 message. The multi-mode mobile station receives this interim response and, thus, receives the TLDN.

The multi-mode mobile station then makes a three-way call via the serving MSC to this TLDN, as indicated by block 418. In response, the serving MSC routes the call to the TLDN, thereby establishing a call leg to the handoff media gateway, as indicated by block 420. The serving MSC also joins this new call leg to the existing call between the endpoint and multi-mode mobile station so that a three-way call is established at the serving MSC.

Figure 9:
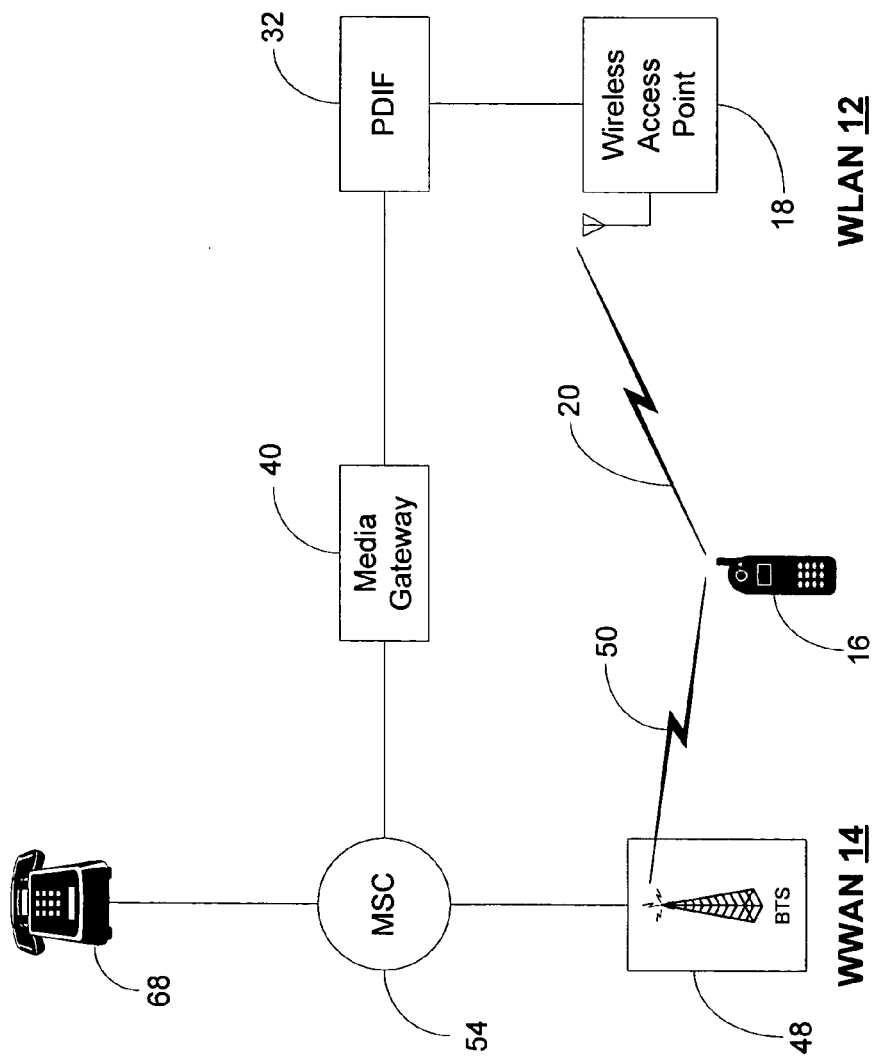
FIG. 9 is a simplified block diagram of a wireless telecommunications system showing the call legs used during the method of FIG. 8, in accordance with an exemplary embodiment of the present invention.

The handoff MGCF controlling the handoff media gateway receives the signaling from the serving MSC and, in response, signals to the CSCF. The CSCF signals to the mobility server. For example, the handoff MGCF may send a SIP INVITE message with the TLDN to the CSCF, which the CSCF then forwards to the mobility server. The mobility server recognizes, e.g., from the TLDN, that the SIP INVITE message from the handoff MGCF is connected to the SIP INVITE message that the multi-mode mobile station sent. Thus, the mobility server may generate a SIP 200 OK message to the multi-mode mobile station's SIP INVITE message. The CSCF then sends the SIP 200 OK message to the multi-mode mobile station, as indicated by block 422. At that point, the multi-mode mobile station has both a WWAN call leg and a WLAN call leg for the call, as indicated by block 424. FIG. 9 shows an example of how the bearer paths for the call, i.e., the call legs, might appear in the network architecture shown in FIG. 1.

With reference to FIG. 9, MSC 54, the serving MSC for multi-mode mobile station 16, serves as the anchor point for the call. Thus, the call includes a call leg extending between the endpoint, e.g., landline telephone 68, and MSC 54. The call also includes the original, WWAN call leg extending between MSC 54 and multi-mode mobile station 16 via WWAN 14. Thus, the WWAN call leg includes air interface 50. The new, WLAN call leg established during the handoff process extends between MSC 54 and multi-mode mobile station 16 via WLAN 12. Thus, the WLAN call leg includes air interface 20, a packet-switched link between wireless access point 18 and PDIF 32, a packet-switched link between PDIF 32 and media gateway 40, and a circuit-switched link between media gateway 40 and MSC 54.

At some point, e.g., a certain period of time after receiving the SIP 200 OK message, the multi-mode mobile station drops the WWAN call leg and cancels its WWAN registration, a indicated by block 426. The multi-mode mobile station continues the call using the WLAN call leg. In this way, a "soft" handoff of the call from the WWAN to the WLAN is effected. In addition, when the WWAN call leg is dropped, the mobility server removes the WWAN call entry from the multi-mode mobile station's activity log, and, when the WWAN registration is canceled, the mobility server removes the WWAN registration entry from the activity log.

Figure 10:
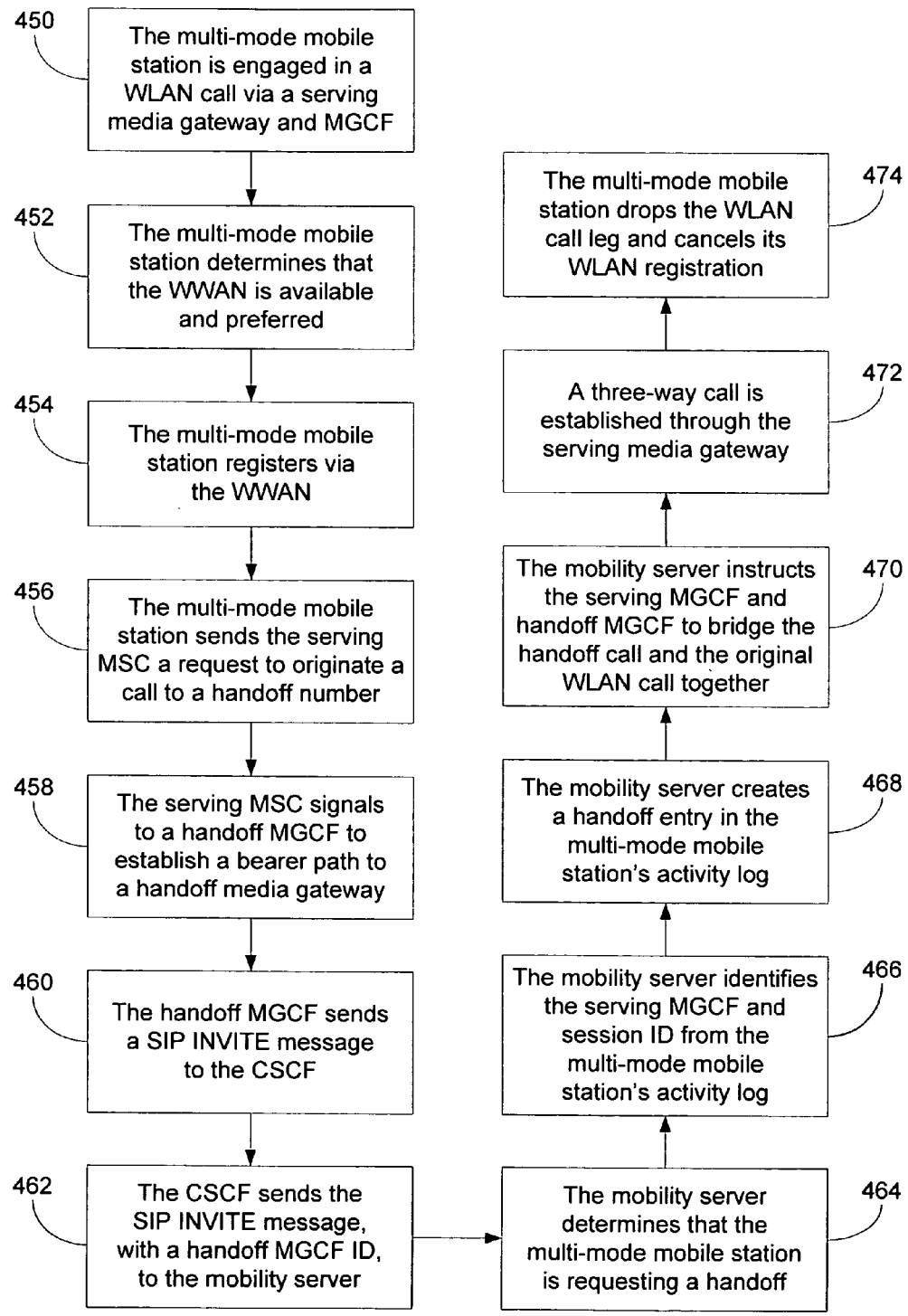
FIG. 10 is a flow chart illustrating a method for call handoff from a WLAN to a WWAN, in accordance with an exemplary embodiment of the present invention.

FIG. 10 is a flow chart illustrating an exemplary call handoff from the WLAN to the WWAN. The process may begin when the multi-mode mobile station is engaged in a WLAN call with an endpoint via a serving media gateway and serving MGCF, as indicated by block 450. The call may have been originated by either the endpoint or the multi-mode mobile station.

At some point during the call, the multi-mode mobile station determines that the WWAN is available and preferred, as indicated by block 452. In response, the multi-mode mobile station registers via the WWAN, as indicated by block 454. The WWAN registration process may occur as set forth in FIG. 3. Thus, the mobility server creates a WWAN registration entry in the multi-mode mobile station's activity log.

The multi-mode mobile station then sends the serving MSC a request to originate a call to a handoff number, as indicated by block 456. The handoff number could be, for example, the same predetermined directory number used to request a handoff from WWAN to WLAN. Alternatively, the handoff number could be a different predetermined directory number, e.g., a number used only to request a WLAN to WWAN handoff.

In this example, the handoff number maps to a point code to a handoff MGCF. Thus, in response to the handoff request, the serving MSC signals to the handoff MGCF, e.g., using SS7 signaling, to establish a bearer path from the serving MSC to a handoff media gateway, as indicated by block 458. The handoff MGCF translates the SS7 signaling into a SIP INVITE message, which the handoff MGCF sends to the CSCF, as indicated by block 460. The CSCF then sends the SIP INVITE message to the mobility server, along with an identification of the handoff MGCF, as indicated by block 462.

The mobility server determines that the multi-mode mobile station is requesting a handoff, as indicated by block 464. In an exemplary embodiment, the mobility server determines that a handoff is requested based on the handoff number in the SIP INVITE message. However, the mobility server may also validate the handoff request by confirming that the multi-mode mobile station's activity log includes: (1) a WLAN registration entry; (2) a WLAN call entry; and (3) a WWAN registration entry. If any of these entries is absent from the multi-mode mobile station's activity log, the mobility server may indicate an error condition.

The mobility server identifies the serving MGCF and the session identifier from the WLAN call entry in the multi-mode mobile station's activity log, as indicated by block 466. The mobility server may also create a handoff entry in the multi-mode mobile station's activity log, as indicated by block 468. The handoff entry may include an identification of the multi-mode mobile station, e.g., its MDN, MSID, and/or ESN, an identification of the handoff MGCF, an identification of the serving MGCF, and the session identifier. The handoff entry may also include a designation, such as "HO_thru_W-LAN," to indicate a handoff from the WLAN to the WWAN. In addition, the handoff entry may include a timestamp and/or other information.

Figure 11:
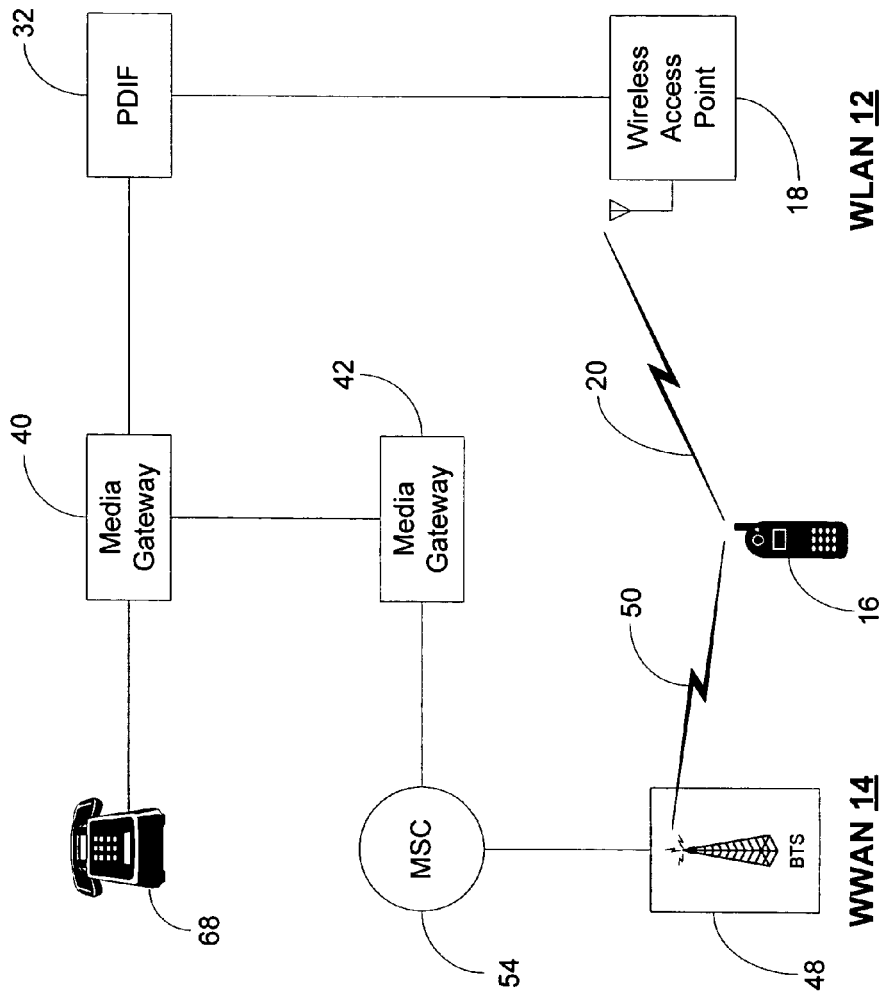
FIG. 11 is a simplified block diagram of a wireless telecommunications system showing the call legs used during the method of FIG. 10, in accordance with an exemplary embodiment of the present invention.

The mobility server instructs the serving MGCF and handoff MGCF to bridge the handoff call and the original WLAN call together, as indicated by block 470. To do this, the mobility server may send SIP INVITE messages with the session identifier to both the serving MGCF and handoff MGCF. In response to these SIP INVITE messages, the serving and handoff MGCFs establish a bearer path extending between the handoff media gateway and the serving media gateway. In this way, a three-way call is established through the serving media gateway, as indicated by block 472. FIG. 11 shows an example of how the bearer paths for the call, i.e., the call legs, might appear in the network architecture shown in FIG. 1.

With reference to FIG. 11, media gateway 40, the serving media gateway for multi-mode mobile station 16, serves as the anchor point for the call. Thus, the call includes a call leg extending between the endpoint, e.g., landline telephone 68, and media gateway 40. The call also includes the original, WLAN call leg extending between media gateway 40 and multi-mode mobile station 16 via WLAN 12. The WLAN call leg includes air interface 20, a packet-switched link between wireless access point 18 and PDIF 32 and a packet-switched link between PDIF 32 and media gateway 40. The new, WWAN call leg established during the handoff process extends between media gateway 40 and multi-mode mobile station 16 via WWAN 14. Thus, the WWAN call leg includes air interface 50, a circuit-switched link between MSC 54 (the serving MSC) and media gateway 42 (the handoff media gateway), and a packet-switched link between media gateway 42 and media gateway 40.

FIGS. 10 and 11 illustrate an example in which the handoff media gateway is not the serving media gateway and in which the handoff MGCF is not the serving MGCF. It is to be understood, however, the handoff media gateway could also be the serving media gateway and/or the handoff MGCF could also be the serving MGCF.

At some point, e.g., a certain period of time after the WWAN call leg is completed, the multi-mode mobile station drops the WLAN call leg and cancels its WLAN registration, a indicated by block 474. Alternatively, another network element, such as the mobility server, may drop the WLAN call leg. The multi-mode mobile station continues the call using the WWAN call leg. In this way, a "soft" handoff of the call from the WLAN to the WWAN is effected. In addition, when the WLAN call leg is dropped, the mobility server removes the WLAN call entry from the multi-mode mobile station's activity log, and, when the WLAN registration is canceled, the mobility server removes the WLAN registration entry from the activity log.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for effecting a handoff of a multi-mode mobile station from a first wireless network to a second wireless network, said multi-mode mobile station having a first interface for wireless communication with said first wireless network and a second interface for wireless communication with said second wireless network, said method comprising:
    establishing a call between said multi-mode mobile station and an endpoint, such that said call includes a first call leg between said endpoint and an anchor point of a first serving system and a second call leg between said anchor point and said multi-mode mobile station via said first wireless network;
    storing in a mobility server 1) a first registration entry regarding a connection of said multi-mode mobile station with said first wireless network, and 2) call information regarding said call in an activity log stored in the mobility server, said call information including a unique identifier of said call in said first serving system, wherein said unique identifier includes a session identifier;
    during said call, determining that said second wireless network is available and preferred;
    a second serving system transmitting registration information for said second registration entry in response to said second wireless network being available, said registration information including said identification of said multi-mode mobile station and an identification of said second serving system;
    storing a second registration entry regarding a connection of said multi-mode mobile station with said second wireless network;
    said multi-mode mobile station transmitting a handoff request via said second wireless network, said mobility server receiving said handoff request, wherein said handoff request requests establishment of a call to a predetermined directory number;
    in response to said handoff request, identifying said first serving system from said call information and then said mobility server setting up a third call leg between said anchor point and said multi-mode mobile station via said second wireless network in response to said second registration entry; and
    dropping said second call leg after said third call leg is set up in order to effect a soft handoff from said first wireless network to said second wireless network, wherein said handoff is transparent to said multi-mode mobile station.

2. The method of claim 1, wherein said first wireless network is a wireless wide area network (WWAN) and said second wireless network is a wireless local area network (WLAN).

3. The method of claim 2, wherein said anchor point is a mobile switching center (MSC) and said identification of said first serving system identifies said MSC.

4. The method of claim 3, wherein establishing a third call leg between said anchor point and said multi-mode mobile station via said second wireless network comprises establishing a circuit-switched link between a media gateway and said MSC.

5. The method of claim 4, wherein establishing a circuit-switched link between a media gateway and said MSC comprises:
    assigning a temporary local directory number (TLDN) for said multi-mode mobile station; and
    said multi-mode mobile station originating a three-way call to said TLDN via said MSC.

6. The method of claim 1, wherein said first wireless network is a wireless local area network (WLAN) and said second wireless network is a wireless wide area network (WWAN).

7. The method of claim 6, wherein said first serving system includes a media gateway as said anchor point, a media gateway control function (MGCF) that controls said MGCF, and a call session control function (CSCF) that controls said MGCF.

8. The method of claim 7, wherein said identification of said first serving system identifies said MGCF.

9. The method of claim 6, wherein establishing a third call leg between said anchor point and said multi-mode mobile station via said second wireless network comprises establishing a circuit-switched link between a mobile switching center (MSC) in said WWAN and a media gateway and establishing a packet-switched link between said media gateway and said anchor point.

10. The method of claim 1, wherein said identification of said multi-mode mobile station includes a mobile directory number (MDN).

11. The method of claim 1, wherein said unique identifier includes a timestamp.

* * * * *